(12) United States Patent
Xu et al.

(10) Patent No.: US 11,647,556 B2
(45) Date of Patent: May 9, 2023

(54) NEGOTIATION ON BEARER TYPE CONFIGURATIONS

(71) Applicant: Apple Inc., Cupertino, CA (US)

(72) Inventors: Fangli Xu, Beijing (CN); Wen Zhao, San Jose, CA (US); Sachin J. Sane, San Jose, CA (US); Sagar B. Shah, San Jose, CA (US); Muthukumaran Dhanapal, San Diego, CA (US); Sriram Subramanian, San Jose, CA (US); Madhukar K. Shanbhag, Santa Clara, CA (US); Vishwanth Kamala Govindaraju, Mountian View, CA (US); Sandeep K. Sunkesala, San Jose, CA (US); Tarakkumar G. Dhanani, San Jose, CA (US); Sree Ram Kodali, San Jose, CA (US); Vijay Gadde, San Jose, CA (US); Shiva Krishna Narra, San Jose, CA (US); Sharad Garg, Cupertino, CA (US); Sanjeevi Balasubramanian, San Jose, CA (US); Dawei Zhang, Saratoga, CA (US); Haijing Hu, Beijing (CN); Rajesh Ambati, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/901,057

(22) Filed: Sep. 1, 2022

(65) Prior Publication Data
US 2022/0418026 A1    Dec. 29, 2022

Related U.S. Application Data

(62) Division of application No. 16/959,995, filed as application No. PCT/CN2019/100796 on Aug. 15, 2019, now Pat. No. 11,470,665.

(51) Int. Cl.
*H04W 76/15* (2018.01)
*H04W 76/12* (2018.01)
(Continued)

(52) U.S. Cl.
CPC .......... *H04W 76/15* (2018.02); *H04W 24/10* (2013.01); *H04W 28/0278* (2013.01);
(Continued)

(58) Field of Classification Search
CPC . H04W 76/15; H04W 24/10; H04W 28/0278; H04W 28/0933; H04W 28/18; H04W 76/12
See application file for complete search history.

(56) References Cited

U.S. PATENT DOCUMENTS

2016/0255537 A1  9/2016  Uchino
2017/0303286 A1* 10/2017  Sang ..................... H04W 76/27
(Continued)

FOREIGN PATENT DOCUMENTS

CN  109478945  3/2019
WO  2018028374  2/2018
WO  2018144193  8/2018

OTHER PUBLICATIONS

CATT 3GPP TSG-RAN WG2 Meeting #106, R2-1906917 Bearer type negotiation; May 17, 2019.
(Continued)

*Primary Examiner* — Mazda Sabouri
(74) *Attorney, Agent, or Firm* — Kowert, Hood, Munyon, Rankin & Goetzel, P.C.

(57) ABSTRACT

Apparatuses, systems, and methods for a wireless device to perform negotiation of bearer type configuration and/or related parameters. A user equipment device (UE) and/or network may determine a bearer configuration and/or other parameters based on information or measurements of the
(Continued)

UE. The UE and the BS may exchange data using a negotiated configuration.

20 Claims, 10 Drawing Sheets

(51) Int. Cl.
*H04W 28/08* (2023.01)
*H04W 24/10* (2009.01)
*H04W 28/02* (2009.01)
*H04W 28/18* (2009.01)

(52) U.S. Cl.
CPC ....... *H04W 28/0933* (2020.05); *H04W 28/18* (2013.01); *H04W 76/12* (2018.02)

(56) References Cited

U.S. PATENT DOCUMENTS

2017/0311200 A1* 10/2017 Koskinen .............. H04W 16/32
2018/0220470 A1   8/2018 Zacharias
2018/0376366 A1* 12/2018 Singh .................... H04W 88/08
2020/0059821 A1*  2/2020 Wirth ................... H04B 17/309
2021/0120450 A1*  4/2021 Peng .................... H04W 16/14
2022/0248495 A1*  8/2022 Mildh ................... H04W 76/22

OTHER PUBLICATIONS

International Search Report in PCT application No. PCT/CN2019/100796; dated May 14, 2020; 12 pages.

* cited by examiner

US 11,647,556 B2

NEGOTIATION ON BEARER TYPE CONFIGURATIONS

PRIORITY CLAIM

This application is a divisional of U.S. patent application Ser. No. 16/959,995, entitled "Negotiation on Bearer Type Configurations," filed Jul. 2, 2020, which is a national phase entry of PCT application number PCT/CN2019/100796, entitled "Negotiation on Bearer Type Configurations," filed Aug. 15, 2019, which is hereby incorporated by reference in its entirety as though fully and completely set forth herein.

FIELD

The present application relates to wireless devices, and more particularly to apparatus, systems, and methods for negotiating bearer types and bearer type configurations.

DESCRIPTION OF THE RELATED ART

Wireless communication systems are rapidly growing in usage. Further, wireless communication technology has evolved from voice-only communications to also include the transmission of data, such as Internet and multimedia content. Dual connectivity procedures may improve user experience significantly, but may introduce new challenges as well. Examples of new challenges include rapid power drain and associated thermal issues. Accordingly, improvements in the field are desired.

SUMMARY

Embodiments relate to apparatuses, systems, and methods to perform negotiation of bearer types, bearer type configurations, and/or related parameters.

In some embodiments, a user equipment device (UE) may enter a dual connectivity mode of communication with a cellular network. The UE may determine a suggested uplink bearer configuration and/or a suggested downlink bearer configuration and transmit the suggested bearer configurations to the network. The network may select a bearer configuration or configurations based on the UE's suggested bearer configurations and/or other information, and may transmit an indication of the selected bearer configuration to the UE, e.g., if the selected bearer configuration is used for uplink transition by the UE. The UE may exchange data with the network using the selected bearer configuration. The network may also select a downlink bearer configuration based on the UE suggestion and exchange data with the UE using the selected downlink bear configuration.

In some embodiments, a UE may transmit a measurement report to the network. The network may select a bearer configuration based on the measurement report, and may transmit an indication of the selected bearer configurations to the UE. The UE may exchange data with the network using the selected bearer configuration.

In some embodiments, a UE may transmit information to the network. The network may select bearer configurations including a range of values for a split bearer parameter based on the information, and may transmit an indication of the selected bearer configuration to the UE, e.g., if the selected bearer configuration is used for uplink transition by the UE. The UE may exchange data with the network using the selected bearer configuration and dynamically adjusting the split bearer parameter within the range of values. In addition, the network may also select a downlink bearer configuration based on the UE transmitted information and may exchange data with the UE using the selected downlink bear configuration.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
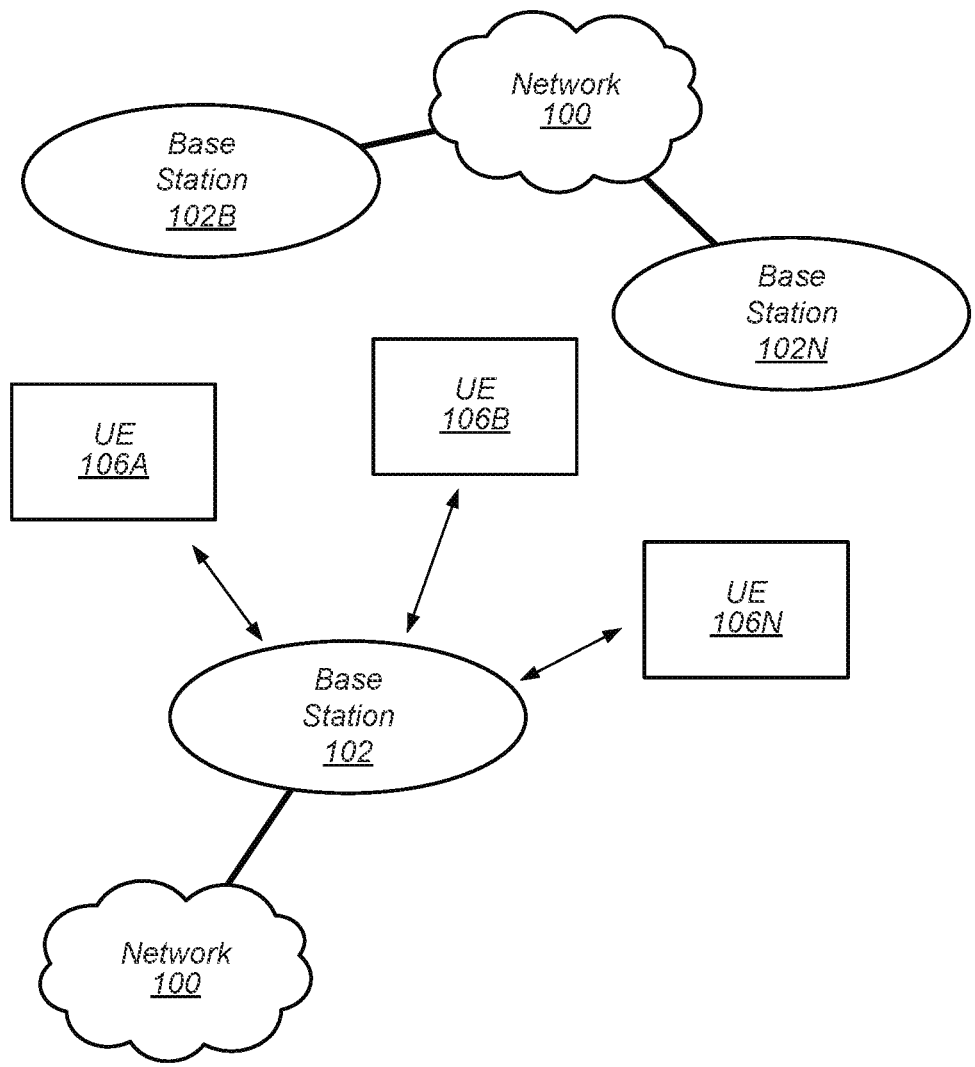
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
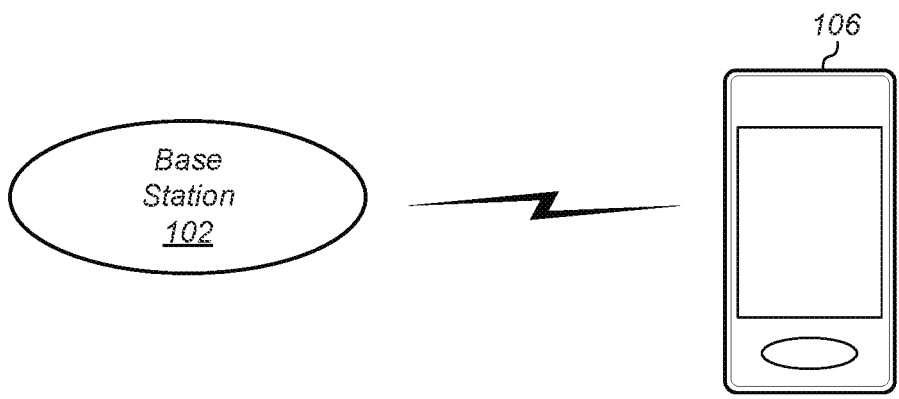
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
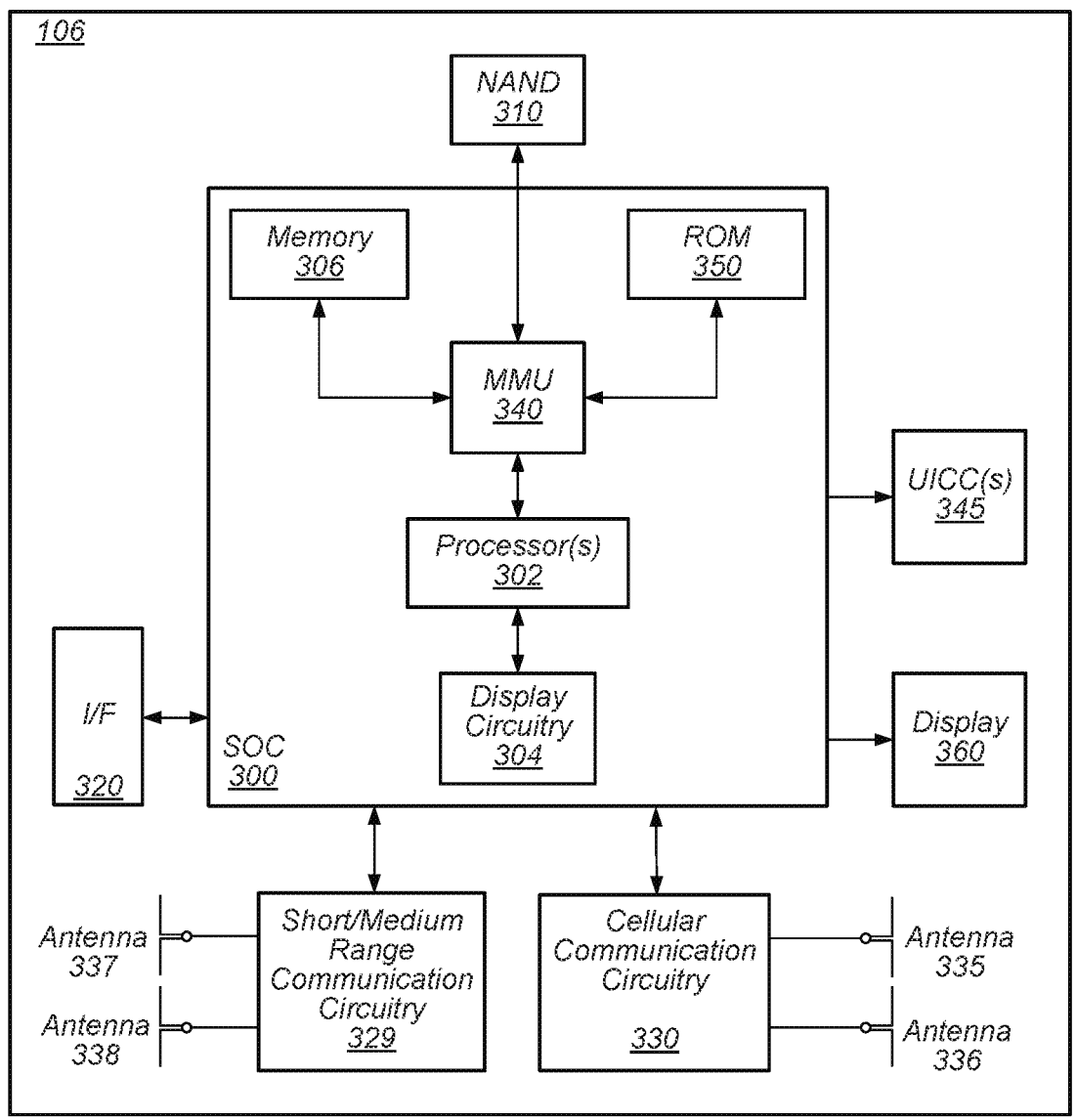
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 329, cellular communication circuitry 330, connector OF 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements/processors may be included in cellular communication circuitry 330 and, similarly, one or more processing elements/processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
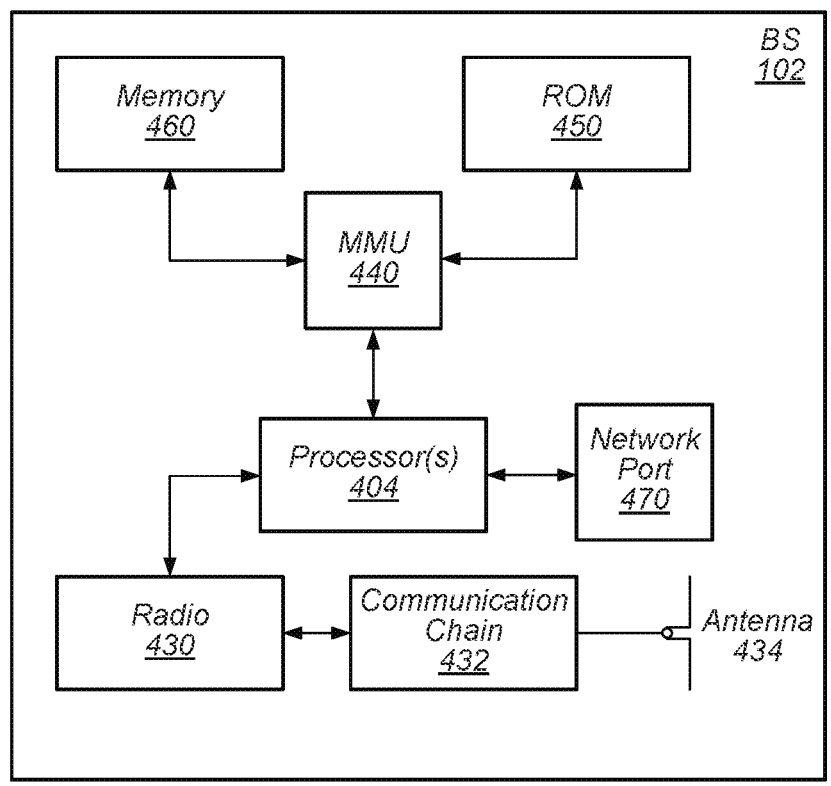
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
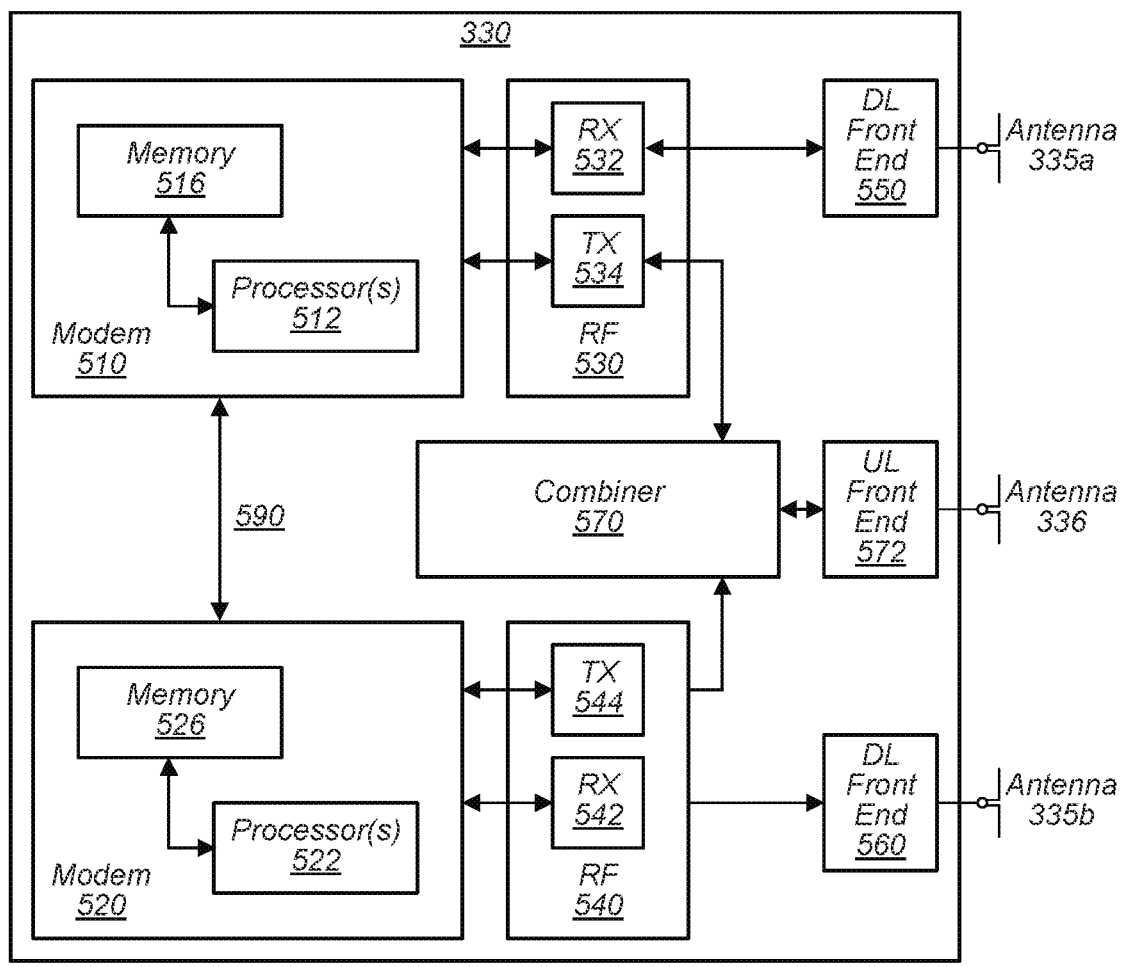
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR. In some embodiments, antennas 335*a-b* and 336 may be shared between the RATs and modems as desired.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a combiner 570 may couple transmit circuitry 534 to uplink (UL) front end 572. Combiner 570 may be or include a switch and/or multiplexer. In addition, combiner 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), combiner 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), combiner 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured to transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

Additionally, the modem 510 and modem 520 may coordinate their transmit and receive activities via link 590. For example, the modems 510 and 520 may coordinate according to various bearer configurations such as bearer split thresholds negotiated with the network according to the embodiments described further with respect to FIG. 8.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
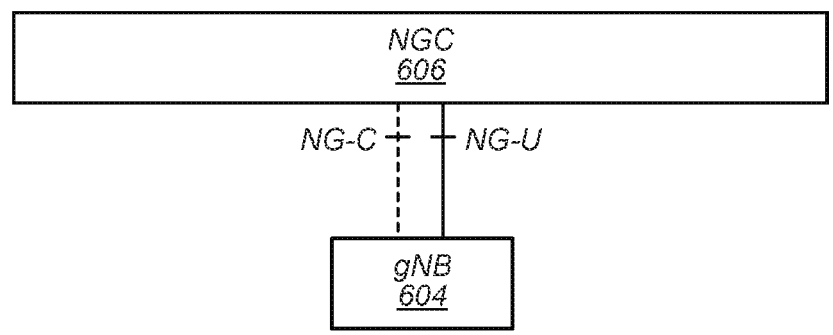
FIGS. 6 and 7 illustrate examples of a 5G NR base station (gNB), according to some embodiments.
Figure 7:
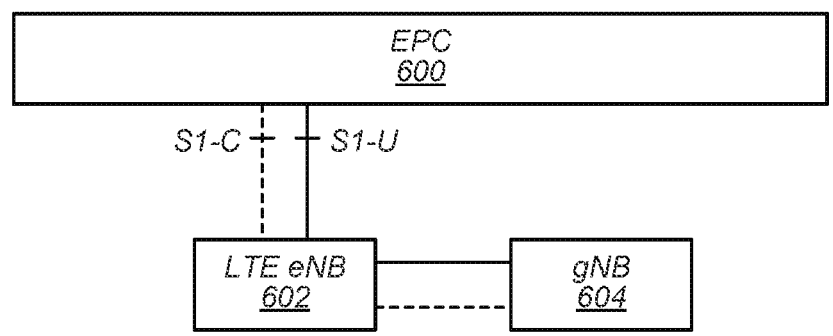

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink and/or uplink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
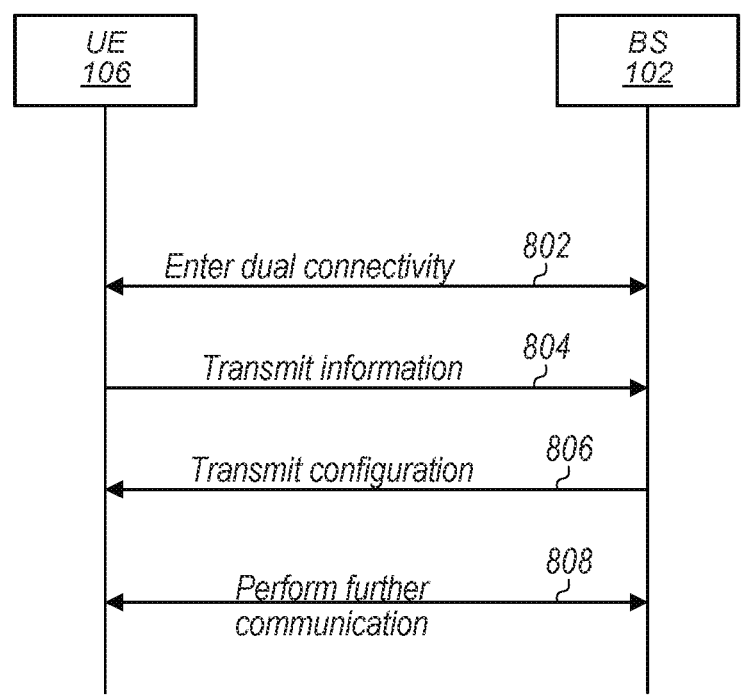
FIG. 8 illustrates techniques for negotiating bearer configuration, according to some embodiments.

FIG. 8—Negotiating Bearer Configuration

In multi-RAT dual-connectivity (MR-DC), a UE (e.g., UE 106N) may communicate simultaneously with a wireless (e.g., cellular) network using cells of two different RATs. The UE may maintain two control plane connections with the network, e.g., via a master cell group (MCG) and a secondary cell group (SCG). In the MCG, a primary cell (PCell) may remain active for uplink (UL) and downlink (DL) control (e.g., and potentially data) communications. Similarly, in the SCG, a primary secondary cell (PSCell) may remain active for UL and DL communications, e.g., of control information. It will be appreciated that remaining active does not preclude operating according to discontinuous reception (DRX). Thus, the UE may support simultaneous reception and transmission using the MCG and SCG (e.g., via the PCell and/or PSCell, among other possible cells).

In the user plane, the UE may support three bearer types, e.g., MCG-bearer, SCG-bearer, and split bearer (e.g., using both the MCG and SCG). In some embodiments, for a split bearer configuration, UL transmissions up to a (e.g., configurable) threshold amount of data may be transmitted via only the primary RLC entity (e.g., via the MCG, although the SCG may also serve as the primary RLC entity, if desired). In some embodiments, for UL transmission equal to or greater than the threshold amount, transmission may occur via both primary RLC entity and secondary RLC entity. In existing MR-DC mechanisms (e.g., including Evolved Universal Mobile Telecommunications System (UMTS) Terrestrial Radio Access (EUTRA)-NR-DC (EN-DC), in which LTE is the MCG and NR is the SCG), the bearer type and (for split bearer) the UL amount of data threshold may be configured by the network. The split between the MCG and SCG may be referred to as split bearer configuration. The split bearer configuration may include both the threshold for initiating splitting (e.g., ul-DataSplitThresold) and the portion of data to be transmitted by each cell group after the threshold is reached. Such a threshold may be evaluated relative to the amount of data in the UE's UL buffer, e.g., for the split bearer. In other words, in some embodiments, if the amount of data in the buffer is below the threshold, the MCG may be used for transmission of all data in the buffer, but if the amount of data in the buffer reaches the threshold, the data may be split with a portion being transmitted on the MCG and a second portion being transmitted on the SCG. Relevant technical specifications include 3GPP 36.323, 36.331, and 38.331. Among other details, these specifications list various possible thresholds for ul-DataSplitThresold (e.g., b0, b100, b200, b400, b800, b1600, b3200, b6400, b12800, b25600, b51200, b102400, b204800, b409600, and b819200), however it will be noted that embodiments of the present disclosure may include other threshold values and configurations.

Conversely the split bearer configuration may include both the threshold for initiating splitting (e.g., dl-DataSplit-Thresold) and the portion of data to be transmitted by each cell group after the threshold is reached (e.g., offloading ratio). Such a threshold may be evaluated relative to the amount of data in the Network's data buffer, e.g., for the split bearer. In other words, in some embodiments, if the amount of data in the buffer is below the threshold, the MCG may be used for transmission of all data in the buffer, but if the amount of data in the buffer reaches the threshold, the data may be split with a portion being transmitted on the MCG and a second portion being transmitted on the SCG.

Radio transmission and reception may vary in power consumption based on what RAT and/or frequency is used to perform the transmission. For example, LTE may require less energy than NR frequency band 1 (FR1) (e.g., 450-6,000 MHz, according to some embodiments), which may require less energy than NR FR2 (e.g., 24,250-52,600 MHz, according to some embodiments). For example, NR FR1 and FR2 may include beamforming techniques which may require higher power for transmission than LTE. Further, FR2 may include more beams, and more highly focused beams) than FR1, which may also require higher power.

In the case of a UE operating according to EN-DC, if the network configures the NR SCG as the primary RLC entity (e.g., UL and/or DL), the UE power consumption may vary and thermal overheating may occur. In particular, due to the high power requirements associated with beamforming, a UE performing transmissions according to NR for a long period of time may reach temperature thresholds, and then signal to the network to reduce NR transmissions. This may result in a cyclic pattern with significant amounts of signaling (e.g., use of NR leads to overheating leads to signaling leads to decreased use of NR leads to normal temperatures leads to increased use of NR leads to overheating, etc.). This pattern may occur if the network configures an SCG bearer on NR or if the network configures a split bearer with a primary RLC entity as NR (e.g., via an NR SCG).

It will be appreciated that high power drain and overheating may also happen to a UE even in the DL reception cases. As a result, it may be desirable for a UE to negotiate bearer type and bearer type configuration (dl-DataSplitThresold) based on factors observed from UE side.

FIG. 8 is a communication flow diagram which illustrates exemplary techniques for negotiating bearer configuration. The techniques of FIG. 8 may allow for a UE and network to negotiate bearer configurations (e.g., MCG, SCG, or split bearer, and any split bearer configuration parameters) to avoid the various problems described above. For example, according to various embodiments described above a UE may perform UL transmissions using NR FR1 and/or NR FR2 at a low enough rate to reduce or avoid the overheating problems described above.

Aspects of the method of FIG. 8 may be implemented by a network including one or more base stations (e.g., BS 102) in communication with one or more wireless device, such as the UE(s) 106, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.) may cause the UE or base station(s) to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. Further, the method may be applied in other contexts (e.g., between multiple UEs, e.g., in device-to-device communications). In various embodiments, some of the elements of the methods shown may be performed concurrently, in a different order than shown, may be substituted for by other method elements, or may be omitted. Additional method elements may also be performed as desired. As shown, the method may operate as follows.

A UE 106 in communication with one or more BS 102 of a wireless network, e.g., a cellular network, may enter a dual connectivity mode with the network, according to some embodiments (802). The dual connectivity mode may be EN-DC, e.g., the MCG may operate according to LTE and the SCG may operate according to NR (e.g., including FR1 and/or FR2). The MCG and SCG may be provided by the same or different base stations (e.g., one or more BS 102).

The BS 102 may provide initial configuration information, e.g., related to dual connectivity. Such configuration information may include an indication of a bearer (e.g., MCG, SCG, or split). Similarly, the configuration information may include an indication of a threshold for use of both cell groups in a split bearer configuration (e.g., ul-DataSplit-Thresold or dl-DataSplitThresold) and/or an indication of what portion of data to transmit using the SCG of the threshold is reached. Further, the configuration may include whether data should initially be split on a split bearer or all transmitted on the MCG, e.g., via a parameter ul-DataSplit-DRB-ViaSCG (e.g., true may indicate that both cell groups should be used, false may indicate that only MCG should be used initially).

In some embodiments, the initial configuration information may provide a range of buffer (e.g., a range for the amount of data) to trigger splitting data over the split bearer. In other words, in addition to or instead of indicating a single ul-DataSplitThreshold, the initial configuration information may indicate a threshold range (e.g., ul-SplitThresholdRange). For example, a network may set UL-SplitThresholdRange as b6400 to b409600, UL-DataSplitThreshold as b51200, and ul-DataSplitDRB-ViaSCG as FALSE. Such a configuration may cause the UE to use an initial UL-DataSplitThreshold of b51200, and may permit the UE to adjust the threshold within the range of b6400 to b409600 as desired (e.g., based on conditions, as discussed below).

In some embodiments, the initial configuration information may provide a range of portions for splitting, e.g., if a split threshold is reached. For example, the configuration information may indicate to direct between a first percentage and a second percentage to a secondary RLC entity in the event that the split threshold is reached. For example, if a SCG is a primary RLC entity of a split bearer, the configuration information may indicate that if the split threshold is reached, 30-60% of the UL data may be directed to the secondary RLC entity (e.g., the MCG).

In some embodiments, the initial configuration information may specify respective ranges for a plurality of respective split bearer parameters (e.g., a first range for data split threshold, a second range for offloading ratio, etc.).

In some embodiments, the initial configuration information may cause the UE to perform and report one or more measurements. The measurements may include any radio link measurements such as signal-noise ratio (SNR), signal to interference and noise ratio (SINR), reference signal received power (RSRP), reference signal received quality (RSRQ), received signal strength indicator (RSSI), channel quality indicator (CQI), channel state information (C SI), block error rate (BLER), bit error rate (BER), channel impulse response (CIR), channel error response (CER), etc. Parameters related to how and when these measurements may be performed and/or reported may be specified, such as hysteresis parameters.

The initial configuration information may be provided by radio resource control (RRC) message, or other type of signaling. The configuration may apply to actions performed by one or more layers of the UE 106, e.g., including the Packet Data Convergence Protocol (PDCP), radio link control (RLC), and/or MAC layers, etc. For example, the configuration may apply to how an NR PDCP layer splits a split bearer for LTE and NR RLC layers, e.g., as discussed with respect to FIG. 9 below.

The UE 102 and BS 102 may exchange communications of data (e.g., application data, payload data, etc.) and/or other control information (e.g., UL and/or DL directions) prior to entering dual connectivity and/or while in dual connectivity.

The UE 102 may transmit information to the BS 102 (804), according to some embodiments.

In some embodiments, the information may indicate one or more preferences (e.g., suggestions) of the UE related to bearer configuration (e.g., bearer type, offloading ratio (e.g., a split ratio) and/or threshold of a split bearer, etc.). Such suggestions or preferences may be based on any or all of: battery level of the UE, thermal status (e.g., temperature) of the UE or of any particular component(s), active applications, whether the device is locked or actively in use, etc. The suggestions may include one or more of: a suggested bearer (e.g., MCG, SCG, or split), preferred RAT for UL transmission and DL reception (e.g., LTE or NR, etc.), preferred NR frequency band (e.g., FR1 or FR2), preferred primary RLC entity for a split bearer (e.g., LTE, NR FR1, NR FR2), and/or preferred offloading ratio and/or threshold for a split bearer (e.g., 70% to SCG for transmissions greater than 1000 Mbytes, etc.). For example, the suggestions may include a range for each RAT, e.g., a range for a split threshold for each RAT. For example, the suggestion(s) may include a split threshold range for LTE and a second split threshold range for NR.

It will be appreciated that the suggested bearer (e.g., MCG, SCG, or split), preferred RAT for UL transmission and DL reception (e.g., LTE or NR, etc.), preferred primary RLC entity for a split bearer (e.g., LTE, NR FR1, NR FR2), and/or preferred offloading ratio and/or threshold for a split bearer (e.g., 70% to SCG for transmissions greater than 1000 Mbytes, etc.) may be different between UL and DL. In other words, any suggestion for UL may be independent of any suggestion for DL and vice versa. In various embodiments, the UE may make suggestions for only UL configuration(s), only DL configuration(s), or both UL and DL configuration(s).

The UE may determine such preferences based on various factors including measurements of the MCG and/or SCG, thermal information, etc. This information may be provided to the network through RRC (e.g., UE assistance information) and/or a media access control (MAC) control element (CE), among various possibilities. In some embodiments, the UE may transmit data on underlying measurements (e.g., thermal status, battery level, application activity, etc.) in addition to or instead of transmitting preference information.

In some embodiments, the UE may transmit one or more measurement reports to the BS 102. Such report(s) may be transmitted as specified in initial configuration information. For example, the UE may transmit a report on the RSRP, e.g., of the MCG and/or SCG. Further, the UE may transmit one or more buffer status report (BSR), e.g., indicating the amount of UL data in a buffer of the UE for transmission to the BS.

The network may determine a (e.g., updated) bearer configuration and BS 102 may transmit an indication of the selected bearer configuration to the UE 106 (806), according to some embodiments. The selected (e.g., negotiated) bearer configuration may be transmitted as an RRC reconfiguration, among various possibilities.

The selected bearer configuration may be selected based on the information transmitted by the UE. For example, the selected bearer configuration may be based on the preferences indicated by the UE and/or any reports of measurements and/or BSR. The BS may also consider other information. For example, the network may consider measurements performed by the BS (e.g., UL SINR of one or both cell groups, e.g., as measured by the BS or other network elements). The network may also consider other factors such as traffic of other UEs, load on either or both of the MCG and/or SCG, load on other cells, bandwidth availability, interference from other cells/networks/RATs, network policies, etc. For example, the network may attempt to balance load among various cells of the network, including the MCG and/or SCG.

In some embodiments, the DL bearer selection and/or DL bearer configuration may not be transmitted to the UE by the network. For example, the network may select to configure the bearers according to the parameters suggested/reported by the UE and start exchange data traffic using the selection and configuration autonomously.

The UE 106 and BS 102 may perform further communication, e.g., according to the selected bearer configuration (808), according to some embodiments. Such further communication may include UL and/or DL transmission of data and/or control information.

For UL transmissions, the UE 106 may operate according to the (e.g., updated) selected bearer configuration of 806. For example, the UE may use a bearer indicated by the configuration, and, if that bearer is a split bearer, the UE may use any offloading ratio and/or threshold for directing data of split bearer to the MCG and/or SCG. For example, if a split bearer is specified, the UE may use a primary RLC entity for any data transmissions less (e.g., in number of bits, bytes, etc.) than a data split threshold. The UE may use the primary RLC entity and the secondary RLC entity for any transmissions greater than the data split threshold, and may split the data between the two RLC entities according to an offloading ratio. Similarly, if the bearer configuration provides a range of data split thresholds, the UE may dynamically adapt the threshold that it uses within that range, e.g., as desired by the UE, e.g., according to conditions. Still further, if the bearer configuration provides a range of offloading ratios, the UE may dynamically adapt the ratio that it uses within that range, e.g., as desired by the UE, e.g., according to conditions. The UE may consider any of various factors (e.g., measurements) in adapting the data split threshold and/or offloading ratio.

Similarly, for DL transmissions, the BS 102 may operate according to the (e.g., updated) selected bearer configuration of 806. For example, the BS may use a bearer consistent with the selected configuration, and, if that bearer is a split bearer, the BS may use any offloading ratio and/or threshold for directing data of split bearer to the MCG and/or SCG. For example, if a split bearer is selected, the BS may use a primary RLC entity for any data transmissions less (e.g., in number of bits, bytes, etc.) than a data split threshold. The BS may use the primary RLC entity and the secondary RLC entity for any transmissions greater than the data split threshold, and may split the data between the two RLC entities according to an offloading ratio. Similarly, if the bearer configuration provides a range of data split thresholds, the BS may dynamically adapt the threshold that it uses within that range, e.g., as desired by the BS and/or as indicated by the UE, e.g., according to conditions. Still further, if the selected bearer configuration provides a range of offloading ratios, the BS may dynamically adapt the ratio that it uses within that range, e.g., as desired BS and/or as indicated by the UE, e.g., according to conditions. The BS may consider any of various factors (e.g., measurements) and/or further indications from the UE in adapting the data split threshold and/or offloading ratio.

Figure 9:
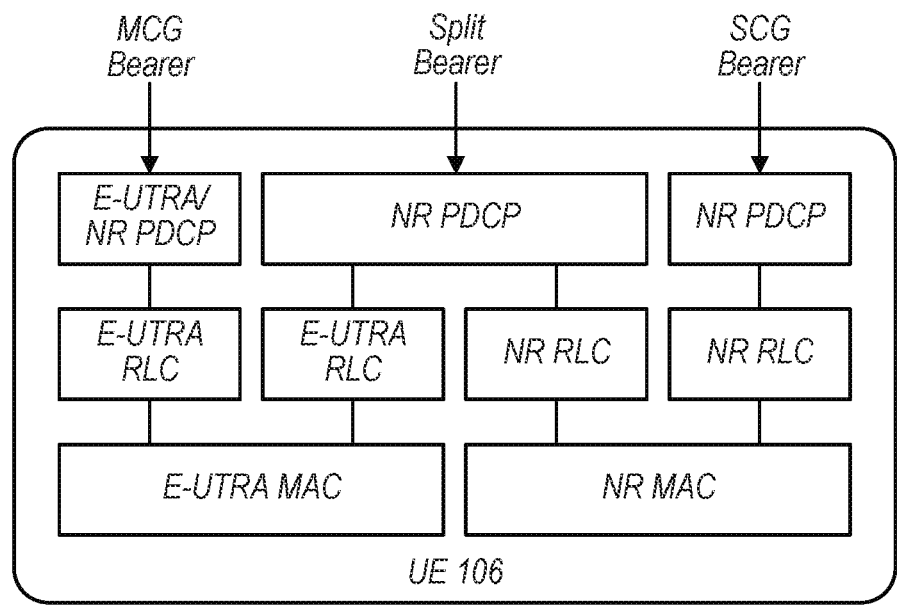
FIG. 9 illustrates an exemplary architecture for different cell groups and split bearers, according to some embodiments.

FIG. 9—Architecture for Different Cell Groups and Split Bearers

FIG. 9 illustrates aspects of an exemplary radio protocol architecture, according to some embodiments. The illustrated architecture may be an example or portion of cellular communication circuitry, e.g., as may be included in a UE 106 as illustrated in FIG. 3 and FIG. 5, among various possibilities. The example may be illustrated in context of EN-DC.

As shown, a MAC layer of each RAT may handle both a dedicated bearer (e.g., the MCG bearer for LTE and/or an SCG bearer for NR) and a split bearer. In contrast, a NR PDCP layer may handle a split bearer, a separate instance of an NR PDCP layer may handle an SCG bearer, and a joint LTE/NR PDCP layer may handle an MCG bearer. Further, two LTE RLC layer instances and two NR RLC layer instances may handle the three bearers, e.g., separate LTE and NR RLC instances may handle the split bearer.

Figure 10:
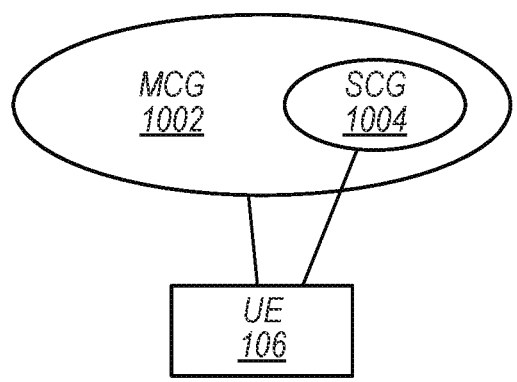
FIGS. 10 and 11 illustrate aspects of an exemplary dual connectivity connection, according to some embodiments.
Figure 11:
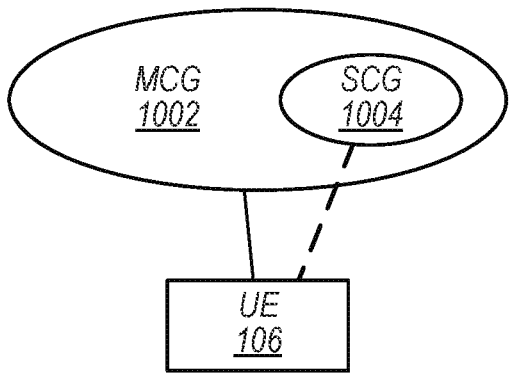

FIGS. 10 and 11—Dual Connectivity Connection.

FIG. 10 illustrates an exemplary wireless environment in which a UE 106 may use a dual connectivity (DC) connection such as EN-DC, according to some embodiments. As shown, the UE may have separate connections (e.g., separate bearers) to an MCG 1002 and SCG 1004. In some embodiments, the MCG may correspond to a macro cell while the SCG may correspond to a smaller cell. The MCG and SCG may be provided by the same or different BS 102. For example, the MCG and SCG may be provided by collocated BS 102s, or a single BS 102 performing multiple logical roles. The MCG and SCG may be provided by physically separated BS 102s. The SCG may correspond to a particular portion of the geographic region covered by the MCG.

FIG. 11 illustrates the possibility that over use of the SCG 1004 for UL transmissions may lead to overheating of the UE 106 and/or significant amounts of signaling (e.g., between the UE 106 and one or more BS 102) to avoid, reduce, or mitigate overheating. As noted above, UL transmissions on NR FR1 and NR FR2 may require high power due to relatively focused (e.g., beamforming) transmissions. Accordingly, if NR transmissions continue for sufficiently long (note, the length of time may depend on various factors including use of FR1 vs. FR2, ambient temperatures, other activity of the device, etc.), the UE 106 may overheat or approach a threshold of overheating. Accordingly, the UE may signal the network to change DC parameters to increase use of the MCG 1002 (e.g., LTE). This may lead to undesirable cycling of overheating and signaling related to the beginning and ending of overheating conditions.

Figure 12:
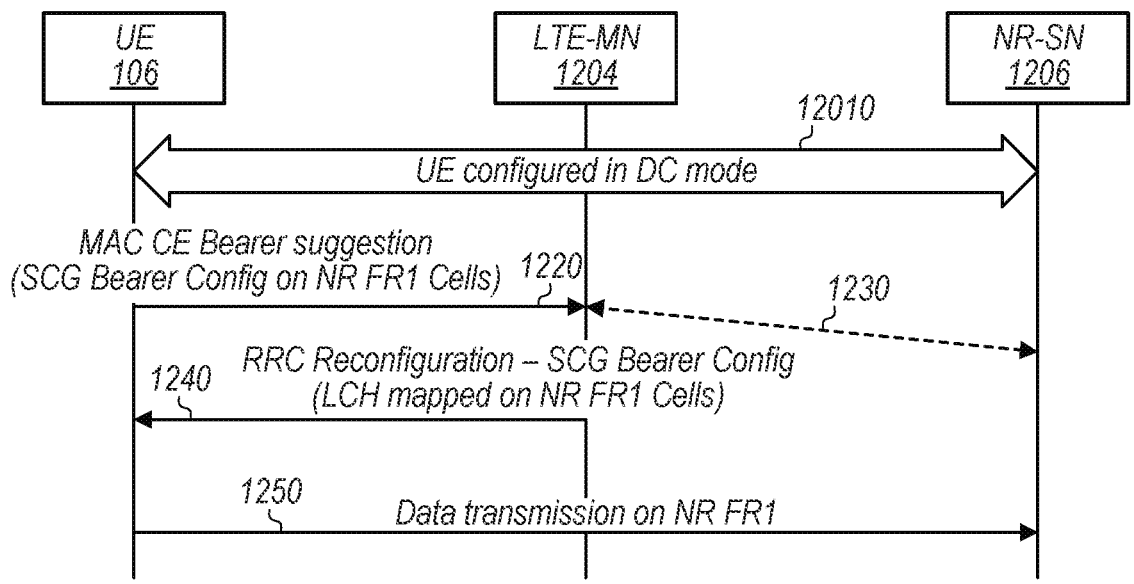
FIGS. 12-14 illustrate examples of a user equipment device transmitting suggestions for bearer configuration, according to some embodiments.
Figure 13:
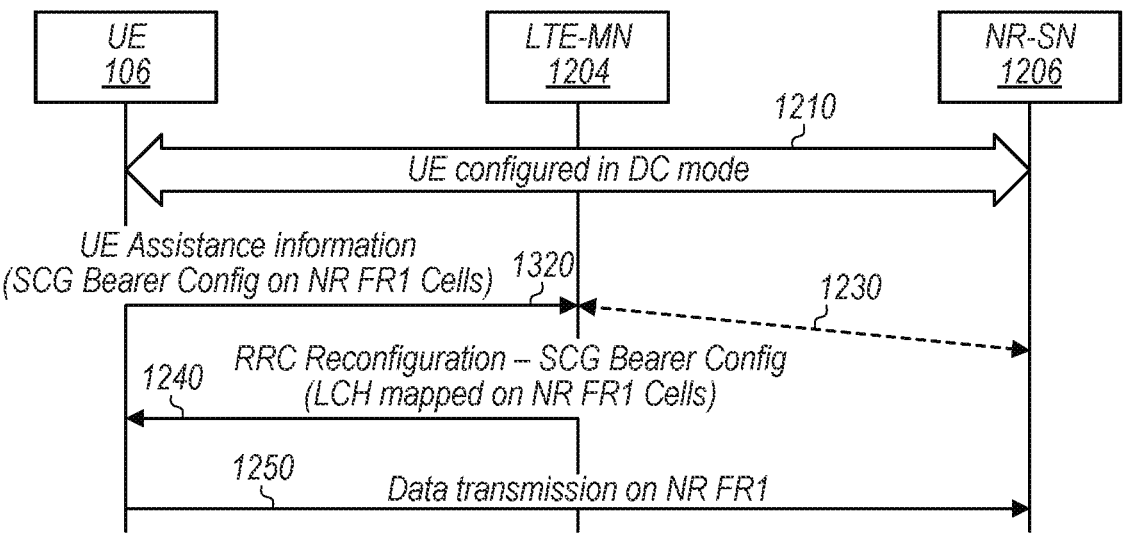
Figure 14:
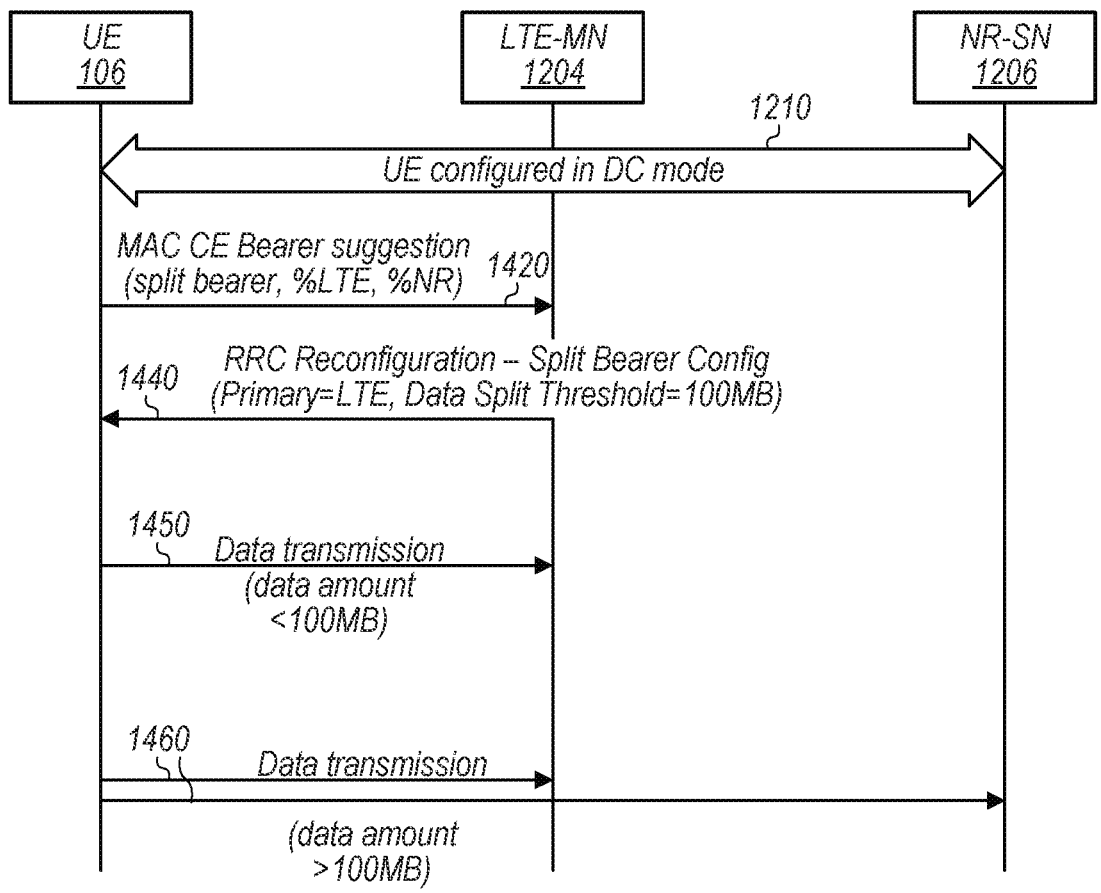

FIGS. 12-14—Transmitting Suggestions for Bearer Configuration

FIGS. 12 and 13 illustrate examples of a UE transmitting a bearer suggestion to a network. As shown in FIG. 12, a UE 106 may be configured in a DC mode (e.g., EN-DC) with a LTE master node (MN) 1204 (e.g., a PCell of an MCG) and a NR secondary node (SN) 1206 (e.g., a PSCell of a SCG) (1210). The configuration may be as described above with respect to 802. The UE may transmit a bearer suggestion to the MN (1220). The bearer suggestion may be an example of the information transmitted as described above with respect to 804. The bearer suggestion may be transmitted as a MAC CE. In the illustrated example, the bearer suggestion may indicate the UE's suggestion to the network to configure an SCG bearer on NR FR1 cell(s). The MN may exchange information regarding this suggestion with the SN (1230). For example, the MN may inform the SN that the SCG bearer will be configured on NR FR1 cells, and the SN may acknowledge the message and/or may confirm that resources are available. The MN may transmit an RRC configuration (e.g., reconfiguration) message to the UE, e.g., indicating that the SCG bearer configuration includes a logical channel (LCH) mapped on to NR FR1 cell(s) (1240). The RRC reconfiguration message may be an example of the transmission of configuration information described above with respect to 806. The UE may communicate with the SN using NR FR1 (1250). The communication may be an example of the further communication described above with respect to 808. The communication may include UL transmissions on FR1, e.g., according to the RRC reconfiguration.

FIG. 13 illustrates an example similar to that of FIG. 12. In the case of FIG. 13, the UE may be configured in DC mode as described above with respect to 1210. The UE may transmit UE assistance information, e.g., via one or more RRC message to the MN 1204 (1320). The UE assistance information may include the same information as described above with respect to 1220. However, the format, timing, and resources used for the transmission may be different (e.g., RRC instead of MAC CE). The remainder of FIG. 13 (e.g., 1230, 1240, and 1250) may proceed as described above with respect to FIG. 12.

FIG. 14 illustrates an example of a suggestion related to a split bearer suggestion. Similar to FIGS. 12 and 13, the UE may be configured in DC mode as described above with respect to 1210. The UE may transmit a bearer suggestion indicating a split bearer and associated suggested configuration parameters (1420). The configuration parameters may include any of the split bearer features, e.g., as discussed with respect to 806. For example, the suggested parameters may include a suggested split (or range of splits) for UL and/or DL data transmissions between LTE and NR. For example, the parameters may include a percentage to be transmitted on each RAT or each cell group or a ratio of one transmission type to the other (e.g., an offloading ratio).

Additionally, the suggested parameters may include a threshold (or a threshold range) for transmitting on the secondary RLC entity. In the illustrated example, the bearer suggestion and parameters are transmitted by MAC CE. However, it will be appreciated that other formats and channels may be used to transmit such information as desired. For example, a MAC CE may be used, among various possibilities. Although not shown in FIG. 14, it will be appreciated that the MN 1204 may confer with or inform SN 1206 about the bearer suggestion and/or configuration selection, e.g., as in 1230.

Split bearer parameters such as a data split threshold may be selected (e.g., for suggestion to the BS) by the UE based on various factors (e.g., measurements). For example, the UE may consider one or more of: MCG Pcell RSRP, MCG PCell SINR, SCG Pscell RSRP, SCG Pscell SINR, BLER on SCG, BLER on MCG, battery level, status of one or more applications executing on the UE, and/or thermal (e.g., temperature measurements of the UE (e.g., as a whole or at a specific component or components). Additional or different measurements may also be used, e.g., of radio conditions and/or performance of the UE. In other words, any of various measurements of DL conditions may be used to inform the UE's selection of recommended UL parameters. Additionally, or alternatively, the UE may consider corresponding UL measurements (e.g., as measured by a BS 102 and reported to the UE).

Tables 1 and 2 below are illustrative examples of selecting a suggested ul-DataSplitThreshold based on DL measurements. Such tables may be used anytime a UE wishes to recommend split bearer parameters or update a previous recommendation. For example, such parameters may be used if ul-DataSplitDRB-ViaSCG is FALSE and if conditions on the MCG are better than the conditions on the SCG (e.g., plus a configurable threshold), among various possibilities. For example, such a table may be based on conditions of the MCG (e.g., as measured by RSRP, SNR, and/or other metrics) in comparison to conditions (e.g., as measured by RSRP, SNR, and/or other metrics) of the SCG (e.g., and potentially a threshold). In other words, various tables may be used which correspond to various levels of differences in conditions between the MCG and SCG. For example, if conditions at the MCG are significantly better than at the SCG, the UE may use a table that leads to relatively more use of the MCG (e.g., higher data split thresholds). Similarly, if conditions are better at the SCG than the MCG, the UE may use a table that leads to relatively more use of the SCG (e.g., lower data split thresholds). Thus, the recommended bearer configuration may be based on a comparison of the MCG and SCG.

TABLE 1 illustrates selecting a threshold based on RSRP of the MCG (e.g., the PCell).

| RSRP range of MCG (dBm) | ul-DataSplitThreshold |
|---|---|
| −60 to −70 | 66553600 |
| −70 to −90 | 64096000 |
| −90 to −100 | 62457600 |
| ... | ... |
| ... | ... |
| −120 to −130 | B800 |

TABLE 2 illustrates selecting a threshold based on SNR of the MCG (e.g., the PCell).

| SNR range of MCG, e.g., measured based on sounding reference signals (dB) | ul-DataSplitThreshold |
|---|---|
| 25 to 30 | 66553600 |
| 20 to 25 | 64096000 |
| 15 to 20 | 62457600 |
| ... | ... |
| ... | ... |
| −5 to 0 | B800 |

It will be appreciated that, although Tables 1 and 2 illustrate selection of ul-DataSplitThreshold, other split bearer parameters may be selected in a similar manner. Further, bearer selection, e.g., MCG, SCG, or split bearer may be performed based on the same or similar factors, e.g., using tables of ranges for one or more measurements.

Returning to FIG. 14, based on the suggested parameters, the MN may transmit an RRC configuration (or reconfiguration) message to the UE, e.g., including updated bearer configuration (1440, e.g., similar to 1240). In the illustrated example, the selected configuration may include a split bearer configuration with LTE as the primary RLC entity and a data split threshold of 100 MB. Further, a data offloading ratio or portions for each RAT may also be included (e.g., an offloading ratio). It will be appreciated that the illustrated values are exemplary only and that other values or parameters may be included. For a first transmission that is less than the data split threshold (e.g., <100 MB), the data may be transmitted entirely using the MN (1450). For a second transmission that exceeds the data split threshold (e.g., >100 MB), the UL transmissions may be split (e.g., according to the ratio) between the MN an SN (1460). It will be appreciated that transmissions 1450 and 1460 are illustrative examples of communications as described with respect to 808. Further, it will be appreciated that the order of the two transmissions is exemplary only; any number of transmissions less than and/or greater than the threshold may occur in any order.

Figures 15, 16:
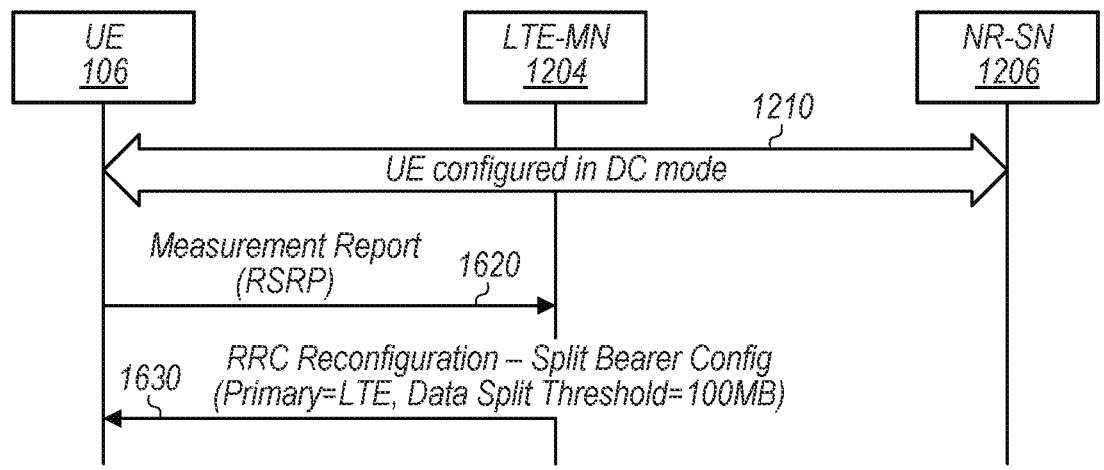
FIG. 15 illustrates an exemplary bearer suggestion structure, according to some embodiments.
FIG. 16 illustrates aspects of dynamic bearer configuration, according to some embodiments.

FIG. 15—Exemplary Bearer Suggestion Structure

FIG. 15 and tables 3-5 illustrate an exemplary data structure for transmitting a bearer suggestion, e.g., as in 804. In the illustrated example, a MAC CE is shown. However, it will be appreciated that other structures (e.g., an RRC message) may be used, and similar features and design elements may be used.

Table 3 shows a bearer suggestion structure. The example may be compared to 3GPP 36.321 and/or may be applicable to 3GPP 38.321. As shown, a new index 10011 may be added to include a bearer suggestion.

| Index | LCID values |
|---|---|
| 0 | Common control channel (CCCH) |
| 00001-01010 | Identity of the logical channel |
| 1011 | CCCH |
| 1100 | CCCH |
| 01101-10010 | Reserved |
| 10011 | Bearer suggestion |
| 10100 | Recommended bit rate query |
| 10101 | SPS confirmation |
| 10110 | Truncated sidelink BSR |
| 10111 | Sidelink BSR |
| 11000 | Dual connectivity power headroom report |
| 11001 | Extended power headroom report |
| 11010 | Power headroom report |

| Index | LCID values |
|---|---|
| 11011 | C-RNTI |
| 11100 | Truncated BSR |
| 11101 | Short BSR |
| 11110 | Long BSR |
| 11111 | Padding |

The bearer suggestion may be formatted as shown in FIG. 15, according to some embodiments. However, it will be appreciated that other formats or structures may be used. In the example, the bearer suggestion format may include a logical channel identifier (LCH-ID), bearer type, split bearer threshold (note that additional or different split bearer parameters may be included, e.g., an offloading ratio), and an indication of FR1 or FR2.

The bearer type field may use an index as illustrated in Table 4, according to some embodiments.

| Bearer type | Index |
|---|---|
| MCG (only) | 0 |
| SCG (only) | 1 |
| Split (MCG preferred) | 2 |
| Split (SCG preferred) | 3 |

The split bearer threshold field may use an index as illustrated in Table 5, according to some embodiments.

| Split bearer threshold | Index |
|---|---|
| B0 | 0 |
| B100 | 1 |
| B200 | 2 |
| B400 | 3 |
| B800 | 4 |
| B1600 | 5 |
| B3200 | 6 |
| B6400 | 7 |
| B12800 | 8 |
| B25600 | 9 |
| B51200 | 10 |
| B204800 | 11 |
| B409600 | 12 |
| B819200 | 13 |

It will be appreciated that FIG. 15 and tables 3-5 are exemplary only and that other formats are possible. For example, additional fields may be included (e.g., offloading ratio, etc.), fields may be combined (e.g., an index for a combination of split threshold and offloading ratio may be used, etc.), or not all illustrated fields may be included.

FIG. 16—Network Selection of Bearer Configuration Based on UE Information

FIG. 16 illustrates an example of a network (e.g., BS 102 or other network element) selecting a bearer configuration based on UE information. As shown, the UE may be configured in a DC mode, e.g., as described above with respect to 802 (1210). The network may provide configuration information including instructions for the UE to take and report one or more measurements. The UE may provide a measurement report to the network, e.g., via a transmission to a BS 102 providing the MN (1620). In the illustrated example, the measurement report may include one or more RSRP measurements. However, it will be appreciated that alternative and/or additional measurements may be included. The measurement(s) may be of a PCell, a PSCell, and/or other cell or cell group. Further, the measurement report may include or be associated with other reports (e.g., a BSR, a report on thermal status of the UE, etc.). The measurement report may be or be associated with a regularly scheduled report to the network, such as channel state information (CSI). Based on the measurement report, the network may select a bearer configuration and transmit configuration message (e.g., an RRC reconfiguration message) to the UE indicating the selected bearer configuration (1630). The bearer configuration message may be based on one or more of: measurements reported in the measurement report, buffer status of the UE, and/or measurements taken by the BS 102 (and/or other BS 102s). The network may use tables similar to Tables 1 and 2 (described above) to select a configuration, among various possibilities. For example, based on reported DL RSRP (e.g., in the measurement report), UL SNR (e.g., measured by the BS 102 of the MN), and/or BSR, the network may select a configuration for the UE. In the illustrated example, the configuration message indicates a split bearer configuration with a primary RLC entity on LTE and a data split threshold of 100 MB, however other configurations may be selected as desired. For example, such a data split threshold (e.g., and/or ratio, etc.) may be selected based on DL RSRP of a PCell (e.g., as reported by the UE in a measurement report), among various possibilities. The UE may then communicate with the network (including the MN and/or SN) according to the configuration. Additional measurement reports and additional configuration messages may be sent, e.g., based on a schedule and/or based on changing conditions (e.g., detected based on measurements, etc.). Thus, the configuration may be updated by the network (e.g., periodically or as needed) in response to changing conditions as reported by the UE.

Range of Parameters

In some embodiments, a network (e.g., BS 102 or other network element) may configure a UE to operate flexibly within a range of parameters. For example, (e.g., in 802 and/or 806), the BS 102 may transmit configuration information indicating the range of parameters and (e.g., in 808) the UE may dynamically select parameter values within that range while communicating with the network. In some embodiments, the range of parameters may be selected by the network based on information provided by the UE (e.g., preferences and/or measurements, e.g., in 804). In other embodiments, the range of parameters may be selected by the network without input from the UE (e.g., in 802 and so that 804 and 806 are omitted).

The range of parameters may include a range of split threshold, a range of offloading ratios, and/or a selection of possible bearer types (e.g., MCG, SCG, and/or split), among various possibilities. The UE may then autonomously (or automatically) change actual values within the range of parameters according to its internal preference. For example, the UE may dynamically adjust the parameter (e.g., a data split threshold, offloading ratio, etc.) within the range based on detecting a change in radio conditions (e.g., measurements of RSRP, SNR, BLER, etc.).

As an illustrative example, in an RRC reconfiguration message, in PDCP-configuration (e.g., or other suitable message and/or field), the network may include a new information element (IE): UL-SplitThresholdRange. The network may set UL-SplitThresholdRange as b6400 to b409600. The network may use the same or a different IE to set ULDataSplitThreshold (e.g., an initial configured value) as b51200 and ul-DataSplitDRB-ViaSCG as FALSE. Based on this configuration, the UE may start with UL-DataSplit-Threshold as b51200. Then, based on measurements, if MCG cell is performing better (e.g., or otherwise based on internal preference), UE may increase ULDataSplitThreshold up to b409600 (e.g., upper limit in this example) or any value between b51200 and b409600 without having any communication with network about a change in UL-DataSplitThreshold. Similarly, if based on measurements MCG cell is performing worse (e.g., or otherwise based on internal preference), the UE may decrease ULDataSplitThreshold as low as b6400 (e.g., lower limit in this example) or any value between b51200 and b6400 without having any communication with network about change in UL-DataSplitThreshold. If UE does not make measurements of the MCG (or is otherwise unable to make any conclusion about UL-DataSplitThreshold), it may use the initial network configured value (e.g., b51200 in this example).

In some embodiments, the new RRC IE may be configured as follows:

```
[[ ul-DataSplitThresholdRange-rx CHOICE {
release NULL,
start ENUMERATED {
b0, b100, b200, b400, b800, b1600, b3200, b6400, b12800,
b25600, b51200, b102400, b204800, b409600, b819200,
spare1}
end ENUMERATED {
b0, b100, b200, b400, b800, b1600, b3200, b6400, b12800,
b25600, b51200, b102400, b204800, b409600, b819200,
spare1}
}
This new IE may be compared to the existing ul-DataSplitThreshold IE
(e.g., see 3GPP 36.331 and 38.331):
[[ ul-DataSplitThreshold-r13 CHOICE {
release NULL,
setup ENUMERATED {
b0, b100, b200, b400, b800, b1600, b3200, b6400, b12800,
b25600, b51200, b102400, b204800, b409600, b819200,
spare1}
}
```

It will be appreciated that the ul-DataSplitThresholdRange IE described above is exemplary only, and that alternative formats or other details of the IE may be used as desired.

Additional Information and Examples

In the following, exemplary embodiments are provided.

An exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Yet another exemplary set of embodiments may include a 5G NR network node or base station configured to perform any action or combination of actions as substantially described herein in the Detailed Description and/or Figures.

Yet another exemplary set of embodiments may include a 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a user equipment device (UE) to:
enter a dual connectivity mode with a cellular network;
receive, from a base station of the cellular network, an indication of a selected bearer configuration including a range of values for at least one split bearer parameter; and
while transmitting data to the base station:
dynamically adjust the at least one split bearer parameter within the range of values, wherein said dynamically adjusting includes using a first value of the at least one split bearer parameter at a first time and using a second value of the at least one split bearer parameter at a second time.

2. The apparatus of claim 1, wherein the selected bearer configuration further includes an initial value for the at least one split bearer parameter.

3. The apparatus of claim 1, wherein the at least one split bearer parameter includes a data split threshold.

4. The apparatus of claim 3, wherein said dynamically adjusting includes adjusting the data split threshold in response to detecting a change in radio conditions.

5. The apparatus of claim 1, wherein the at least one split bearer parameter includes an offloading ratio.

6. The apparatus of claim 1, wherein the processor is further configured to cause the UE to transmit information to the base station comprising a preference for a bearer configuration.

7. The apparatus of claim 6, wherein the preference for the bearer configuration is based on one or more of:

battery level of the UE;

thermal status of the UE;

thermal stats of a component of the UE;

one or more active application; or whether the UE is locked or actively in use.

8. The apparatus of claim 6, wherein the preference for the bearer configuration comprises a first preference for uplink and a second preference for downlink, the second preference independent of the first preference.

9. The apparatus of claim 6, wherein the preference for the bearer configuration comprises a first split threshold range for a first radio access technology (RAT).

10. The apparatus of claim 9, wherein the preference for the bearer configuration further comprises a second split threshold range for a second RAT.

11. The apparatus of claim 9, wherein the preference for the bearer configuration further comprises a preferred offloading ratio for the first RAT.

12. The apparatus of claim 6, wherein the preference for the bearer configuration comprises a preferred primary radio link control (RLC) entity for a split bearer.

13. The apparatus of claim 1, wherein the processor is further configured to cause the UE to:

dynamically indicate, to the base station, information for adapting a downlink split bearer parameter; and receive downlink transmissions from the base station according to the downlink split bearer parameter.

14. The apparatus of claim 1, further comprising a radio operably coupled to the processor.

15. A method, comprising:

entering a dual connectivity mode with a cellular network;

receiving, from a base station of the cellular network, an indication of a selected bearer configuration including a range of values for at least one split bearer parameter; and while transmitting data to the base station:

dynamically adjusting the at least one split bearer parameter within the range of values, wherein said dynamically adjusting includes using a first value of the at least one split bearer parameter at a first time and using a second value of the at least one split bearer parameter at a second time.

16. The method of claim 15, wherein the at least one split bearer parameter includes a data split threshold.

17. The method of claim 16, wherein said dynamically adjusting includes adjusting the data split threshold in response to detecting a change in radio conditions.

18. A method, comprising:

entering a dual connectivity mode with a user equipment (UE);

transmitting, to the UE, an indication of a selected bearer configuration including a range of values for at least one split bearer parameter; and while transmitting data to the UE:

dynamically adjusting the at least one split bearer parameter within the range of values, wherein said dynamically adjusting includes using a first value of the at least one split bearer parameter at a first time and using a second value of the at least one split bearer parameter at a second time.

19. The method of claim 15, further comprising:

transmitting, to the UE, a second indication of a second selected bearer configuration including a second range of values for a second split bearer parameter; and receiving data from the UE:

according to a third value of the second split bearer parameter at a third time; and according to a fourth value of the second split bearer parameter at a fourth time.

20. The method of claim 15, wherein said dynamically adjusting is in response to one or more indications from the UE.

* * * * *